United States Patent [19]

Shue

[11] 4,207,411
[45] Jun. 10, 1980

[54] COPOLYAMIDE OF BRANCHED $C_{10}$ DIAMINE, BIS(4-AMINOCYCLOHEXYL)-ALKANE, ISOPHTHALIC ACID AND TEREPHTHALIC ACID

[75] Inventor: Robert S. Shue, Bartlesville, Okla.

[73] Assignee: Phillips Petroleum Company, Bartlesville, Okla.

[21] Appl. No.: 643,563

[22] Filed: Dec. 22, 1975

[51] Int. Cl.² ............................................. C08G 69/26
[52] U.S. Cl. ........................................ 528/338; 260/9; 260/33.4 R; 260/37 N; 528/310; 528/324; 528/336; 528/339; 528/340; 528/347; 528/349
[58] Field of Search ............ 260/78 R; 528/338, 347, 528/349

[56] References Cited

U.S. PATENT DOCUMENTS

| 3,145,193 | 8/1964 | Gabler | 260/78 R |
| 3,150,113 | 9/1964 | Gabler | 260/78 R |
| 3,597,400 | 8/1971 | Kashiro et al. | 260/78 R |
| 3,980,621 | 9/1976 | Campbell et al. | 260/78 R |

*Primary Examiner*—Harold D. Anderson

[57] ABSTRACT

A normally solid, transparent, amorphous polyamide having:
first diamine-derived primary structural units of the formula

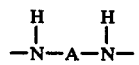

wherein each A is individually selected from the group consisting of 5-methylnonamethylene, 2,4-dimethyloctamethylene, 2,4,6-trimethylheptamethylene and 4-isopropylheptamethylene;
second diamine-derived primary structural units of the formula

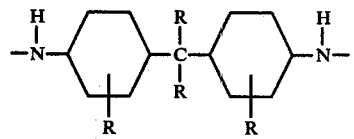

wherein each R is individually selected from the group consisting of hydrogen and methyl;
first diacid-derived primary structural units of the formula

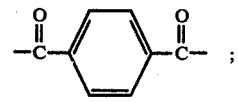

and
second diacid-derived primary structural units of the formula

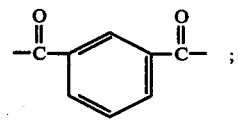

and process of preparation thereof. Other diamine-derived structural units and/or diacid-derived structural units can be present in small amounts.

26 Claims, No Drawings

COPOLYAMIDE OF BRANCHED C₁₀ DIAMINE, BIS(4-AMINOCYCLOHEXYL)-ALKANE, ISOPHTHALIC ACID AND TEREPHTHALIC ACID

This invention relates to polyamides and process of preparation thereof. In one aspect the invention relates to normally solid, transparent, amorphous polyamides. In a specific aspect the invention is directed to normally solid, transparent, amorphous polyamides having high tensile strength, high ductility, and substantial toughness.

U.S. Pat. No. 3,597,400 discloses transparent, amorphous polyamides derived from substantially equimolar amounts of a diamine component consisting of bis(4-aminocyclohexyl)methane and hexamethylenediamine, and a dicarboxylic component consisting of terephthalic acid and isophthalic acid, which are stated to have a good combination of transparency, chemical resistance, softening temperature and melt shapeability. However, for many applications it would also be desirable for the transparent polyamide to have higher tensile strength, greater elongation and greater toughness than provided by the polyamides of U.S. Pat. No. 3,597,400.

Accordingly it is an object of the present invention to provide a new transparent polyamide having a good balance of mechanical properties. An object of the invention is to provide a transparent polyamide having good tensile strength, elongation and toughness. Other objects, aspects, and advantages of the invention will be apparent from a study of the specification and the appended claims to the invention.

The polyamides of the present invention are normally solid, transparent, amorphous polyamides having:

first diamine-derived primary structural units of the formula

wherein each A is individually selected from the group consisting of 5-methylnonamethylene, 2,4-dimethyloctamethylene, 2,4,6-trimethylheptamethylene and 4-isopropylheptamethylene;

second diamine-derived primary structural units of the formula

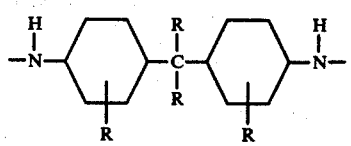

wherein each R is individually selected from the group consisting of hydrogen and methyl;

first diacid-derived primary structural units of the formula

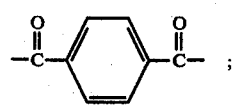

second diacid-derived primary structural units of the formula

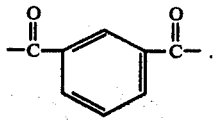

The A in each of the first diamine-derived primary structural units can be solely 5-methylnonamethylene, 2,4-dimethyloctamethylene, 2,4,6-trimethylheptamethylene, or 4-isopropylheptamethylene, but preferably the polyamide contains a mixture of first diamine-derived primary structural units wherein A in some of the units is 5-methylnonamethylene and the A in other units is 2,4-dimethyloctamethylene, with at least 20 percent, preferably at least 50 percent, more preferably at least 70 percent, and even more preferably at least 80 percent, by number, of the A's being 5-methylnonamethylene. Other isomeric first diamine-derived primary structural units can be also present wherein the A in some of the units is 2,4,6-trimethylheptamethylene and/or the A in some of the units is 4-isopropylheptamethylene. In an exemplary embodiment, 20 to 96 percent, by number, of the A's are 5-methylnonamethylene, 4 to 80 percent, by number, of the A's are 2,4-dimethyloctamethylene, 0 to 25 percent, by number, of the A's are 2,4,6-trimethylheptamethylene, and 0 to 25 percent, by number, of the A's are 4-isopropylheptamethylene. In a presently preferred embodiment 70 to 96 percent, by number, of the A's are 5-methylnonamethylene, 4 to 30 percent, by number, of the A's are 2,4-dimethyloctamethylene, 0 to 15 percent, by number, of the A's are 2,4,6-trimethylheptamethylene, and 0 to 15 percent, by number, of the A's are 4-isopropylheptamethylene.

The nitrogen atoms provided by the sum of the first diamine-derived primary structural units and the second diamine-derived primary structural units constitute at least 95 percent, preferably at least 98 percent, and more preferably 100 percent, by number, of the total nitrogen atoms in the polyamide; the balance, if any, of the nitrogen atoms in the polyamide being provided by secondary structural units selected from the group consisting of

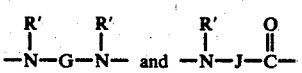

wherein each G is individually selected from the group consisting of divalent hydrocarbon radicals having from 6 to 16 carbon atoms, each R' is individually selected from the group consisting of hydrogen and alkyl radicals having from 1 to 6 carbon atoms, and each J is individually selected from the group consisting of divalent hydrocarbon radicals having from 5 to 15 carbon atoms.

The carbonyl groups provided by the sum of the first diacid-derived primary structural units and the second diacid-derived primary structural units constitute at least 95 percent, preferably at least 98 percent, and more preferably 100 percent, by number, of the total carbonyl groups in the polyamide; the balance, if any, of the carbonyl groups being provided by secondary structural units selected from the group consisting of

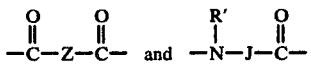

wherein each Z is individually selected from the group consisting of divalent hydrocarbon radicals having from 4 to 14 carbon atoms, and each J is individually selected from the group consisting of divalent hydrocarbon radicals having from 5 to 15 carbon atoms.

The second diamine-derived primary structural units constitute at least 15 percent, preferably at least 20 percent, and more preferably at least 25 percent, by number, but less than (80−0.5X) percent, preferably less than (75−0.6X) percent, by number, of the total of the first diamine-derived primary structural units and the second diamine-derived primary structural units where X is the percent, by number, of first diacid-derived primary structural units in the total of the first diacid-derived primary structural units and the second diacid-derived primary structural units.

The first diacid-derived primary structural units constitute at least 15 percent, preferably at least 20 percent, and more preferably at least 30 percent, by number, but less than (50+Y) percent, by number, of the total of the first diacid-derived primary structural units and the second diacid-derived primary structural units, wherein Y is the percent, by number, of the second diamine-derived primary structural units in the total of the first diamine-derived primary structural units.

In general, the polyamides of the invention will have an inherent viscosity of at least 0.6, preferably in the range of about 0.8 to about 1.9, as measured at 30° C. in a m-cresol solution having a polymer concentration of 0.5 gram/100 milliliters solution. As well as being substantially amorphous and transparent, the polyamides of this invention possess particularly desirable characteristics as to strength, ductility, and toughness. Also, they are relatively resistant to hot solvents such as boiling water or boiling ethanol. Additionally, they have good flow properties, aiding in their use in the fabrication of products. Advantageously, they can be produced through use of the monomers within a wide range of ratios.

A presently preferred method of preparing a polyamide of the present invention comprises utilizing at least one first diamine having the formula

H₂N—A—NH₂ wherein each A is individually selected from the group consisting of 5-methylnonamethylene, 2,4-dimethyloctamethylene, 2,4,6-trimethylheptamethylene and 4-isopropylheptamethylene;

at least one second diamine having the formula

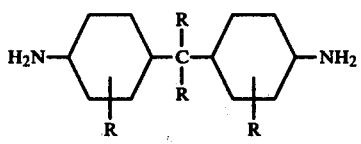

wherein each R is individually selected from the group consisting of hydrogen and methyl;

a first diacid component having the formula

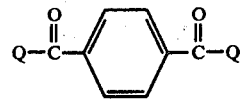

wherein each Q is individually selected from —OH, bromine, chlorine and alkoxy radicals having 1 to 4 carbon atoms; and a second diacid component having the formula

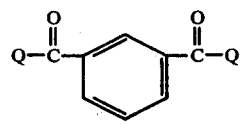

wherein each Q is individually selected from —OH, bromine, chlorine and alkoxy radicals having 1 to 4 carbon atoms; to produce salts of diamine and diacid; and subjecting the thus produced salts to polycondensation conditions to thereby form the polyamide. Preferably, Q is —OH.

The at least one first diamine can consist essentially of any one of 5-methyl-1,9-nonanediamine, 2,4-dimethyl-1,8-octanediamine, 2,4,6-trimethyl-1,7-heptanediamine or 4-isopropyl-1,7-heptanediamine, or mixtures of two or more thereof, but preferably comprises a mixture of 5-methyl-1,9-nonanediamine, 2,4-dimethyl-1,8-octanediamine, and 2,4,6-trimethyl-1,7-heptanediamine with the 5-methyl-1,9-nonanediamine constituting at least 20, preferably at least 50, more preferably at least 70, and even more preferably at least 80, mole percent of the mixture. Other isomers, such as 4-isopropyl-1,7-heptanediamine, can be present in the mixture. An exemplary suitable mixture for use as the first diamine comprises 20 to 96 mole percent 5-methyl-1,9-nonanediamine, 4 to 80 mole percent 2,4-dimethyl-1,8-octanediamine, 0 to 25 mole percent 2,4,6-trimethyl-1,7-heptanediamine, and 0 to 25 mole percent 4-isopropyl-1,7-heptanediamine. A presently preferred mixture for use as the first diamine comprises 70 to 96 mole percent 5-methyl-1,9-nonanediamine, 4 to 30 mole percent 2,4-dimethyl-1,8-octanediamine, 0 to 15 mole percent 2,4,6-trimethyl-1,7-heptanediamine, and 0 to 15 mole percent 4-isopropyl-1,7-heptanediamine.

The second diamine can be bis(4-aminocyclohexyl)methane; a methyl derivative thereof, wherein the methyl radical is attached to a carbon atom, for example 2,2-bis(4-aminocyclohexyl)propane; or a mixture of any two or more of these diamines. Although the alicyclic second diamine can be employed in the form of any of its geometric isomers or mixtures thereof, it is presently preferred that the trans,trans isomer constitute about 40 to about 95 mole percent of the second diamine.

The first diacid component can be terephthalic acid; an acid halide of terephthalic acid, for example, terephthaloyl chloride or terephthaloyl bromide; an ester of terephthalic acid, for example, methyl terephthalate, dimethyl terephthalate, methyl ethyl terephthalate, diethyl terephthalate, diisobutyl terephthalate; or mixtures of any two or more of these materials.

The second diacid component can be isophthalic acid; an acid halide of isophthalic acid, for example isophthaloyl chloride or isophthaloyl bromide; an ester of isophthalic acid, for example methyl isophthalate, dimethyl isophthalate, methyl ethyl isophthalate, diethyl isophthalate, diisobutyl isophthalate; or mixtures of any two or more of these materials.

The first and second diamines and the first and second diacid components can be individually introduced into the polycondensation reaction zone and therein be subjected to suitable polycondensation reaction conditions. Alternatively, at least a portion of one or both of the types of diamines can be reacted with at least a portion of one or both of the types of dicarboxylic acids to form the corresponding salts. The preformed salts, together with any additional amounts of diamines and/or dicarboxylic acids, can be introduced into the polycondensation reactor and therein be subjected to suitable polycondensation reaction conditions. In the copolycondensation reaction zone, the molar ratio of the total diamines to the total diacid components will generally be substantially 1:1, although a slight excess, e.g., up to 6 mole percent of the diamines or up to 3 mole percent of the diacid components, can be used.

The copolyamides of this invention can be prepared under any suitable polycondensation conditions. In general, in a preferred procedure in which the diacid components are employed as dicarboxylic acids, the mixture of monomers and/or salts thereof can be heated at temperature(s) in the range of about 200° to about 350° C., preferably in the range of about 260° to about 340° C., for a period of time in the range of about 1 hour to about 24 hours, preferably in the range of about 1.5 hours to about 8 hours. The pressure normally reaches a maximum of not more than about 1000 psig, preferably not more than about 600 psig, and is allowed to diminish by venting gaseous material, sometimes with the aid of an inert gas, the final heating being conducted at a pressure as low as about 1 mm Hg, preferably in the range of about 10 to about 50 mm Hg. If desired, the mixtures of monomers and/or salts can be heated at a lower temperature, e.g., in the range of about 200° to about 230° C., for a period of time, e.g., in the range of about ½ hour to about 6 hours, prior to the heating at temperature(s) in the range of about 260° to about 340° C. Water can be present to serve as a heat transfer agent and to aid in keeping the reactants in the reaction zone. Acetic acid can be present, if desired, in an amount up to about 2 mole percent based on the total diacids, to control and stabilize the molecular weight of the polyamide.

When diacid components other than dicarboxylic acids are employed, reaction conditions known in the art for use with diacid components, sometimes differing from those described above, can be used in the production of the polyamides of this invention.

If desired, up to 5 percent, by number, of the nitrogen atoms in the polyamide can be provided by the inclusion in the polycondensation reaction of one or more other diamines having the structural formula

R'HN-G-NHR' wherein each G is individually selected from the group consisting of divalent hydrocarbon radicals having 6 to 16 carbon atoms and each R' is individually selected from the group consisting of hydrogen and alkyl radicals having from 1 to 6 carbon atoms; and/or at least one amino acid having the formula R'HN—J—CO₂H; and/or at least one lactam having the formula

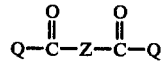

wherein each J is individually selected from the group consisting of divalent hydrocarbon radicals having from 5 to 15 carbon atoms and each R' is individually selected from the group consisting of hydrogen and alkyl radicals having 1 to 6 carbon atoms.

Similarly, if desired, up to 5 percent, by number, of the carbonyl groups in the polyamide can be provided by the inclusion in the polycondensation reaction of one or more of said amino acids, said lactams, and dicarboxylic acid components having the formula $$Q-\overset{O}{\underset{\|}{C}}-Z-\overset{O}{\underset{\|}{C}}-Q$$

wherein each Z is individually selected from the group consisting of divalent hydrocarbon radicals having from 4 to 14 carbon atoms and each Q is individually selected from the group consisting of —OH, bromine, chlorine and alkoxy radicals having 1 to 4 carbon atoms. Preferably, Q is —OH. Thus, there can be employed in the preparation of the polyamide a minor amount of a diamine such as hexamethylenediamine, octamethylenediamine, nonamethylenediamine, decamethylenediamine, hexadecamethylenediamine, 1,4-cyclohexanediamine, 1,4-bis(propylaminomethyl)-cyclohexane, N-methylhexamethylenediamine, N,N'-dimethylhexamethylenediamine, 1,4-bis(aminomethyl)-cyclohexane, N,N'-diethylhexamethylenediamine, N,N'-diethyloctamethylenediamine, N-isopropyl-N'-butyldecamethylenediamine, N,N'-dihexylhexadecamethylenediamine; and/or a minor amount of a dicarboxylic acid or derivative thereof such as adipic acid, suberic acid, azelaic acid, sebacic acid, dodecanedioic acid, tetradecanedioic acid, hexadecanedioic acid, 1,4-cyclohexanedicarboxylic acid, 1,1,3-trimethyl-5-carboxy-3-(p-carboxyphenyl)indane, adipoyl chloride, suberoyl bromide, dimethyl azelate, diethyl sebacate, dodecanedioyl chloride, diisopropyl tetradecanedioate, or dibutyl hexadecanedioate; and/or a minor amount of an amino acid such as 6-aminohexanoic acid, 8-aminooctanoic acid, 10-aminodecanoic acid, 12-aminododecanoic acid, 14-aminotetradecanoic acid, N-methyl-6-aminohexanoic acid, N-ethyl-7-aminoheptanoic acid, N-isopropyl-12-aminododecanoic acid, or N-hexyl-16-aminohexadecanoic acid; and/or a minor amount of a lactam such as the lactam of any of the above-named amino acids.

The polyamides of this invention can be employed as molding resins or in the production of coatings or films. The polyamides of this invention can be blended with various additives such as fillers, pigments, stabilizers, softeners, extenders, or other polymers. For example, there can be incorporated in the polymers of this invention substances such as graphite, carbon black, titanium dioxide, glass fibers, carbon fibers, metal powders, magnesia, silica, asbestos, wollastonite, clays, wood flour, cotton floc, alpha cellulose, mica, and the like. If desired, such additives can be added to the polymerization reactor.

The following data are presented in further illustration of the invention, but should not be construed in undue limitation thereof.

EXAMPLE I

In each of a series of runs, a stirred, stainless steel autoclave (1-liter) was charged with an amount in the range of 0.500 to 0.520 mole, collectively, of diamines and an at least substantially equimolar amount, collectively, of terephthalic acid (TPA) and isophthalic acid (IPA). Unless otherwise noted in the footnotes to Table I, the MND consisted of 87.5 mole percent 5-methyl-1,9-nonanediamine, 12.3 mole percent 2,4-dimethyl-1,8-octanediamine, and 0.2 mole percent 2,4,6-trimethyl-1,7-heptanediamine; the PACM used consisted of the trans,trans, cis,trans, and cis,cis isomers of bis(4-aminocyclohexyl)methane in amounts of 50.7, 40.7, and 8.6 mole percent, respectively; and the PACP used consisted of the trans,trans, cis,trans, and cis,cis isomers of 2,2-bis(4-aminocyclohexyl)propane in amounts of 75.5, 23.7, and 0.7 mole percent, respectively. The charges ranged from equimolar to 3.0 mole percent excess diamines. An amount of distilled water in the range of 23 to 28 weight percent (based on total monomer weight charged) was also charged. The reactor was then closed and thoroughly flushed with nitrogen and sealed under a positive nitrogen pressure. Then the reactor was heated from room temperature to 210° C. over approximately 30 to 35 minutes, and then held substantially at 210° C. for a period of time in the range of 115 to 165 minutes. The reactor was then heated to a temperature in the range of 290° to 300° C. over a period of time in the range of 27 to 50 minutes and then held substantially at that temperature for approximately one hour, venting as necessary to maintain the pressure in the range of 400 to 500 psig. The reactor was then vented to 0 psig over a period of time in the range of 25 to 30 minutes. After which, nitrogen was swept through the reactor at atmospheric pressure for a period of time in the range of 20 to 30 minutes. Next, the reactor was evacuated to 20 mm Hg over a period of time in the range of 5 to 17 minutes and held there for a period of time in the range of 25 to 125 minutes. Except as otherwise indicated, all operations subsequent to the one-hour hold, were carried out at the temperature of the one-hour hold. After the vacuum cycle, the reactor was pressured with nitrogen and allowed to cool under a positive nitrogen pressure. The reactor was then opened and the product was recovered by chipping it from the reactor.

The amounts of the MND, PACM, PACP, TPA and IPA employed in each polycondensation and the characteristics of the resulting polyamides are set forth in the following table. Also included, for comparison, are some runs outside the scope of this invention in which hexamethylenediamine (HMD) was employed as a monomer. In those instances in which a polymer property is represented by a dash, the polymer property was not determined.

TABLE I

| Run | Diamines, Mole % | | | | TPA/IPA Mole Ratio | Diamines/Diacids Mole Ratio | I.V.[a] | Tg, °C.[b] | PMT, °C.[c] | Melt Flow, g/10 min[d] |
|---|---|---|---|---|---|---|---|---|---|---|
| | MND | HMD | PACM | PACP | | | | | | |
| 1[k] | 75.73 | — | 24.27 | — | 50:50 | 1.030 | 1.22 | 142 | — | — |
| 2 | 75.00 | — | 25.00 | — | 50:50 | 1.000 | 1.01 | 140 | — | 17 |
| 3 | 60.04 | — | 39.96 | — | 50:50 | 1.006 | 1.04 | 162 | — | 0.4 |
| 4 | 50.10 | — | 49.90 | — | 50:50 | 1.010 | 1.04 | 174 | — | — |
| 5 | 60.16 | — | 39.84 | — | 60:40 | 1.004 | 1.14 | 160 | — | 0.02 |
| 6 | 60.04 | — | 39.96 | — | 75:25 | 1.006 | 1.26 | 160 | — | — |
| 7 | 60.04 | — | 39.96 | — | 50:50 | 1.006 | 0.83 | 180 | 262 | — |
| 8 | 70.00 | — | 30.00 | — | 65:35 | 1.010 | 1.05 | 150 | 260 | 3.4 |
| 9 | 60.04 | — | 39.96 | — | 40:60 | 1.006 | 1.03 | 157 | 242 | 5.35 |
| 10 | 65.01 | — | 34.99 | — | 60:40 | 1.006 | 1.14 | 153 | — | 0.03 |
| 11 | 70.00 | — | 30.00 | — | 70:30 | 1.010 | 1.21 | 146 | — | 0.03[l] |
| 12[m] | 50.10 | — | 49.90 | — | 40:60 | 1.010 | 1.06 | 171 | 275 | 0.87 |
| 13[n] | 74.85 | — | — | 25.15 | 50:50 | 1.010 | 1.50 | 148 | 219 | 0.80 |
| 14[o] | 50.00 | — | — | 50.00 | 50:50 | 1.000 | 0.86 | 188 | — | — |
| 15 | — | 74.85 | 25.15 | — | 50:50 | 1.010 | 1.1 | 163 | 224 | 1.9 |
| 16 | — | 60.04 | 39.96 | — | 40:60 | 1.006 | 0.84 | 180 | 219 | 10.0 |
| 17[p] | — | 50.10 | 49.90 | — | 40:60 | 1.010 | 1.0 | 187 | 270 | 4.5 |
| 18 | — | 74.85 | — | 25.15 | 50:50 | 1.010 | 1.02 | 172 | 242 | 15.6 |

| Run | Density, g/cc[e] | Flexural Modulus, psi × 10⁻³[f] | Tensile Yield, psi[g] | Elongation, %[g] | Izod Impact Strength, ft-lb/in notch[h] | Heat Deflection Temp., °C. 264 psi[i] | Appearance[j] |
|---|---|---|---|---|---|---|---|
| 1[k] | 1.1235 | 308 | 11,260(B) | 15 | 1.40 | 118 | T |
| 2 | 1.1257 | 308 | 11,780 | 18 | 1.48 | 116 | T |
| 3 | 1.1281 | 324 | 10,480(B) | 9 | 0.55 | 142 | T |
| 4 | 1.1313 | 329 | 5,490(B) | 3 | 1.29 | 154 | T, H |
| 5 | 1.1308 | 322 | 5,960(B) | 4 | 0.29 | 137 | T, H |
| 6 | 1.1334 | 335 | 5,050(B) | 4 | 1.15 | 140 | T, H |
| 7 | 1.1617 | 373 | 6,900(B) | 5 | 1.13 | 158 | T |
| 8 | 1.1284 | 330 | 11,580(B) | 11 | 1.60 | 124 | T |
| 9 | 1.1284 | 338 | 12,380 | 26 | 1.65 | 136 | T |
| 10 | 1.1245 | 325 | 7,360(B) | 6 | 1.11 | 137 | T |
| 11 | 1.1240 | 340 | 10,530 | 13 | 1.47 | 134 | T, H |
| 12[m] | 1.1240 | 345 | 11,530 | 13 | 0.74 | 156 | T |
| 13[n] | 1.1233 | 319 | 12,660 | 35 | 1.44 | 125 | T |
| 14[o] | 1.1200 | 350 | 6,380 | 4 | 0.80 | 172 | T |
| 15 | 1.1673 | 371 | 9,400(B) | 7 | 1.34 | 135 | T |
| 16 | 1.1582 | 374 | 10,940(B) | 9 | 1.39 | 159 | T, H |
| 17[p] | 1.1545 | 390 | 5,640 | 4 | 0.42 | 157 | T |

TABLE I-continued

| 18 | 1.1671 | 383 | 6,540(B) | 5 | 0.58 | 145 | T |

[a] Inherent viscosity (I.V.) was determined at 30° C. in m-cresol solutions having a polyamide concentration of 0.5 g/100 ml solution.
[b] Glass transition temperature (Tg) was determined by differential thermal analysis of premelted and quenched samples.
[c] Polymer-melt temperature (PMT) was determined on polymer samples placed on a heated bar with a temperature gradient.
[d] ASTM D 1238-70, modified to a temperature of 290° C. using a 5-kg weight.
[e] ASTM D 1505-68.
[f] ASTM D 790-66.
[g] ASTM D 638-68. A (B) following value indicates break rather than yield.
[h] ASTM D 256-56.
[i] ASTM D 648-56.
[j] T means transparent; H means haze.
[k] Isomer distribution of PACM unknown.
[l] Value was 0.26 when measured at 318° C. instead of 290° C.
[m] The MND used consisted of 89.75 mole percent 5-methyl-1,9-nonanediamine, 9.54 mole percent 2,4-dimethyl-1,8-octane-diamine, 0.01 mole percent 2,4,6-trimethyl-1,7-heptane-diamine, and 0.70 mole percent 4-isopropyl-1,7-heptane-diamine, and the PACM used consisted of the trans,-trans,cis,trans, and cis,cis isomers in the amounts of 50.12, 41.80, and 8.08 mole percent, respectively.
[n] In this run the temperature was raised to 310° C. during the step of venting to 0 psig and was held at 310° C. for the duration of the run.
[o] The MND used consisted of 89.3 mole percent 5-methyl-1,9-nonanediamine and 10.7 mole percent 2,4-dimethyl-1,8-octanediamine, and the PACP used consisted of the trans,trans,cis,trans, and cis,cis isomers in amounts of 77, 22, and 1 mole percent, respectively.
[p] The PACM used had the same isomer distribution as the PACM described in footnote m.

In each of the runs in Table I, except Runs 8 and 14, the polyamide produced exhibited no crystalline melting point ($T_m$) and no crystallization temperature ($T_c$), as determined by differential thermal analysis of premelted and quenched samples. The polyamide from Run 8 exhibited no $T_m$ but gave an indication of a $T_c$ at 215° C. The polyamide from Run 14 exhibited no $T_c$ but gave a faint, indistinct indication of a $T_m$ at 330° C. Thus, each of the polyamides described in Table I was essentially amorphous.

Comparison of the properties of the polyamides from Runs 2 and 15 in Table I shows that the polyamide in Run 2, which is within the scope of this invention, is stronger, based on tensile strength values, is more ductile, based on elongation values, and is tougher, based on Izod impact strength and elongation values, than the polyamide from Run 15, which is outside the scope of this invention. Similarly, the polyamide from Run 9, which is within the scope of this invention, is stronger, more ductile, and tougher than the polyamide from Run 16, which is outside the scope of this invention. Additionally, the polyamide from Run 12, which is within the scope of this invention, is stronger, more ductile, and tougher than the polyamide from Run 17, which is outside the scope of this invention. Furthermore, the polyamide from Run 13, which is within the scope of this invention, is stronger, more ductile, and tougher than the polyamide from Run 18, which is outside the scope of this invention. All of the polyamides in Table I have a combination of properties which make them useful as molding resins and in the production of coatings or films.

Film specimens prepared from the polyamides of Runs 2, 12, 15, and 17 were subjected to boiling water for 6 hours, at the end of which time each of the specimens showed only minor distortions and no clouding. When film specimens prepared from the same four polyamides were subjected to boiling ethanol for 6 hours, each of the specimens remained essentially unchanged. Although each of the specimens softened slightly during exposure to the ethanol, they regained their stiffness, with only minor distortions, after being removed from the ethanol, cooled, and dried. The specimens prepared from the polyamides of Runs 12, 15, and 17 showed minor surface wrinkles after the 6-hour boiling ethanol treatment, but the specimen prepared from the polyamide of Run 2 did not exhibit these surface wrinkles. The specimen prepared from the polyamide of Run 17 showed slightly more softening than the others during exposure to the boiling ethanol. Thus, the resistance of the specimens prepared from the polyamides of Runs 2 and 12 to boiling water and to boiling ethanol was at least as great as was that of the specimens prepared from the polyamides of Runs 15 and 17.

Reasonable variations and modifications are possible within the scope of the foregoing disclosure and the appended claims to the invention.

That which is claimed is:

1. A normally solid, transparent, amorphous polyamide comprising: first diamine-derived primary structural units of the formula

wherein
each A is individually selected from the group consisting of 5-methylnonamethylene, 2,4-dimethyloctamethylene, 2,4,6-trimethylheptamethylene and 4-isopropylheptamethylene;
second diamine-derived primary structural units of the formula

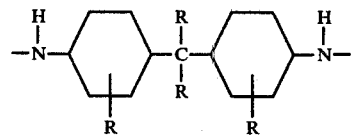

wherein each R is individually selected from the group consisting of hydrogen and methyl;
first diacid-derived primary structural units of the formula

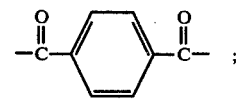

and
second diacid-derived primary structural units of the formula

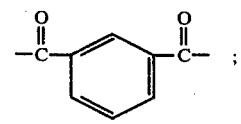

the nitrogen atoms provided by the sum of said first diamine-derived primary structural units and said second diamine-derived primary structural units constituting at least 95 percent, by number, of the total nitrogen atoms in said polyamide;

the carbonyl groups provided by the sum of said first diacid-derived primary structural units and said second diacid-derived primary structural units constituting at least 95 percent, by number, of the total carbonyl groups in said polyamide;

said second diamine-derived primary structural units constituting at least 15 percent, by number, but less than (80−0.5X) percent, by number, of the total of said first diamine-derived primary structural units and said second diamine-derived primary structural units where X is the percent, by number, of said first diacid-derived primary structural units in the total of said first diacid-derived primary structural units and said second diacid-derived primary structural units;

said first diacid-derived primary structural units constituting at least 15 percent, by number, but less than (50+Y) percent, by number, of the total of said first diacid-derived primary structural units and said second diacid-derived primary structural units, wherein Y is the percent, by number, of said second diamine-derived primary structural units in the total of said first diamine-derived primary structural units and said second diamine-derived primary structural units;

said polyamide having an inherent viscosity of at least 0.6 as measured at 30° C. in a m-cresol solution having a polymer concentration of 0.5 gram/100 milliliters solution.

2. A polyamide in accordance with claim 1 wherein the balance, if any, of the nitrogen atoms in said polyamide is provided by secondary structural units selected from the groups consisting of

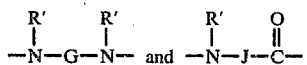

wherein each G is individually selected from the group consisting of divalent hydrocarbon radicals having from 6 to 16 carbon atoms, each R' is individually selected from the group consisting of hydrogen and alkyl radicals having from 1 to 6 carbon atoms, and each J is individually selected from the group consisting of divalent hydrocarbon radicals having from 5 to 15 carbon atoms; and wherein the balance, if any, of the carbonyl groups is provided by secondary structural units selected from the group consisting of

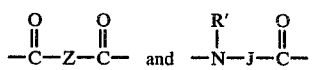

wherein each Z is individually selected from the group consisting of divalent hydrocarbon radicals having from 4 to 14 carbon atoms; and each J is individually selected from the group consisting of divalent hydrocarbon radicals having from 5 to 15 carbon atoms.

3. A polyamide in accordance with claim 2 wherein said second diamine-derived primary structural units constitute less than (75−0.6X) percent, by number, of the total of said first diamine-derived primary structural units and said second diamine-derived primary structural units.

4. A polyamide in accordance with claim 2 wherein said second diamine-derived primary structural units constitute at least 20 percent, by number, of the total of said first diamine-derived primary structural units and said second diamine-derived primary structural units.

5. A polyamide in accordance with claim 4 wherein said first diacid-derived primary structural units constitute at least 20 percent, by number, of the total of said first diacid-derived primary structural units and said second diacid-derived primary structural units.

6. A polyamide in accordance with claim 4 wherein said first diacid-derived primary structural units constitute at least 30 percent, by number, of the total of said first diacid-derived primary structural units and said second diacid-derived primary structural units.

7. A polyamide in accordance with claim 6 wherein said polyamide has an inherent viscosity in the range of 0.8 to 1.9 as measured at 30° C. in a m-cresol solution having a polymer concentration of 0.5 gram/100 milliliters solution.

8. A polyamide in accordance with claim 7 wherein the A in at least 20 percent, by number, of said first diamine-derived primary structural units is 5-methylnonamethylene.

9. A polyamide in accordance with claim 7 wherein the A in at least 70 percent, by number, of said first diamine-derived primary structural units is 5-methylnonamethylene, and wherein from about 40 to about 95 percent, by number, of said second diamine-derived primary structural units are of the trans,trans configuration.

10. A polyamide in accordance with claim 9 wherein each R is hydrogen.

11. A polyamide in accordance with claim 9 wherein said second diamine-derived primary structural units have the formula

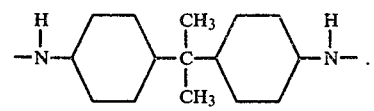

12. A polyamide in accordance with claim 1 wherein said polyamide consists essentially of said first diamine-derived primary structural units, said second diamine-derived primary structural units, said first diacid-derived primary structural units, and said second diacid-derived primary structural units.

13. A polyamide in accordance with claim 12 wherein said second diamine-derived primary structural units constitute less than (75−0.6X) percent, by number, of the total of said first diamine-derived primary structural units and said second diamine-derived primary structural units.

14. A polyamide in accordance with claim 13 wherein said second diamine-derived primary structural units constitute at least 20 percent, by number, of the total of said first diamine-derived primary structural units and said second diamine-derived primary structural units.

15. A polyamide in accordance with claim 14 wherein said first diacid-derived primary structural units constitute at least 20 percent, by number, of the total of said first diacid-derived primary structural units and said second diacid-derived primary structural units.

16. A polyamide in accordance with claim 14 wherein said first diacid-derived primary structural units constitute at least 30 percent, by number, of the total of said first diacid-derived primary structural units and said second diacid-derived primary structural units.

17. A polyamide in accordance with claim 13 wherein the A in 20 to 96 percent, by number, of said first diamine-derived primary structural units is 5-methylnonamethylene, the A in 4 to 80 percent, by number, of said first diamine-derived primary structural units is 2,4-dimethyloctamethylene, the A in 0 to 25 percent, by number, of said first diamine-derived primary structural units is 2,4,6-trimethylheptamethylene, and the A in 0 to 25 percent, by number, of said first diamine-derived primary structural units is 4-isopropylheptamethylene.

18. A polyamide in accordance with claim 17 wherein each R is hydrogen.

19. A polyamide in accordance with claim 17 wherein said second diamine-derived primary structural units have the formula

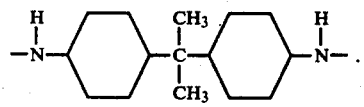

20. A polyamide in accordance with claim 12 wherein the A in at least 80 percent, by number, of said first diamine-derived primary structural units is 5-methylnonamethylene, and the A in each of the balance, if any, of said first diamine-derived primary structural units is individually selected from the group consisting of 2,4-dimethyloctamethylene, 2,4,6-trimethylheptamethylene, and 4-isopropylheptamethylene.

21. A polyamide in accordance with claim 20 wherein each R is hydrogen.

22. A polyamide in accordance with claim 20 wherein said second diamine-derived primary structural units have the formula

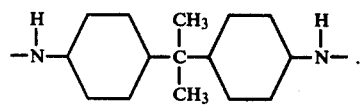

23. A method for the formation of a polyamide in accordance with claim 1 which comprises reacting
at least one first diamine having the formula

wherein each A is individually selected from the group consisting of 5-methylnonamethylene, 2,4-dimethyloctamethylene, 2,4,6-trimethylheptamethylene and 4-isopropylheptamethylene;
at least one second diamine having the formula

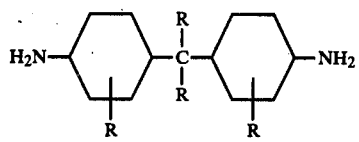

wherein each R is individually selected from the group consisting of hydrogen and methyl;
a first diacid component having the formula

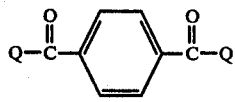

wherein each Q is individually selected from the group consisting of —OH, bromine, chlorine and alkoxy radicals having 1 to 4 carbon atoms; and
a second diacid component having the formula

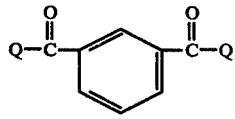

wherein each Q is individually selected from the group consisting of —OH, bromine, chlorine, and alkoxy radicals having 1 to 4 carbon atoms; to produce salts of diamine and diacid; and subjecting the thus produced salts to polycondensation conditions to thereby form said polyamide.

24. A method in accordance with claim 23 wherein the total of the moles of said first diamine and the moles of said second diamine is substantially equal to the total of the moles of said first diacid component and the moles of said second diacid component.

25. A method in accordance with claim 24 wherein each Q in said first diacid component and each Q in said second diacid component is —OH.

26. A method in accordance with claim 25 wherein the A in 20 to 96 percent, by number, of said first diamine-derived primary structural units is 5-methylnonamethylene, the A in 4 to 80 percent, by number, of said first diamine-derived primary structural units is 2,4-dimethyloctamethylene, the A in 0 to 25 percent, by number, of said first diamine-derived primary structural units is 2,4,6-trimethylheptamethylene, and the A in 0 to 25 percent, by number, of said first diamine-derived primary structural units is 4-isopropylheptamethylene.

* * * * *